(12) United States Patent
Shindo et al.

(10) Patent No.: US 8,780,107 B2
(45) Date of Patent: Jul. 15, 2014

(54) IMAGE PROCESSING APPARATUS FOR DISPLAYING IMAGE ON DISPLAY UNIT AND CONTROL METHOD THEREOF

(75) Inventors: Yuki Shindo, Yokohama (JP); Kohei Inamura, Sagamihara (JP)

(73) Assignee: Canon Kabushiki Kaisha, Tokyo (JP)

( * ) Notice: Subject to any disclaimer, the term of this patent is extended or adjusted under 35 U.S.C. 154(b) by 203 days.

(21) Appl. No.: 13/155,888

(22) Filed: Jun. 8, 2011

(65) Prior Publication Data

US 2011/0316849 A1 Dec. 29, 2011

(30) Foreign Application Priority Data

Jun. 29, 2010 (JP) .................. 2010-148210

(51) Int. Cl.
*G06T 15/00* (2011.01)
*H04N 5/202* (2006.01)
*G06K 9/00* (2006.01)

(52) U.S. Cl.
CPC . *G06T 15/00* (2013.01); *G06K 9/00* (2013.01); *H04N 5/202* (2013.01)
USPC .......................................... 345/419; 348/687

(58) Field of Classification Search
CPC ........... H04N 5/217; G06T 15/20; G06K 9/00
USPC ........... 345/42, 672, 694, 712, 254, 450, 554, 345/46, 51, 54, 222.1, 223.1, 419, 618, 345/102; 348/618, 624, 42, 672, 694, 712; 382/154, 168, 282, 173, 169, 106, 103, 382/107
See application file for complete search history.

(56) References Cited

U.S. PATENT DOCUMENTS

| 7,162,074 | B2 * | 1/2007 | Shibayama | 382/154 |
| 7,756,299 | B2 * | 7/2010 | Higaki | 382/106 |
| 8,131,098 | B2 * | 3/2012 | Watanabe et al. | 382/254 |
| 2005/0058369 | A1 * | 3/2005 | Sanse et al. | 382/282 |
| 2007/0081716 | A1 * | 4/2007 | Ha et al. | 382/154 |
| 2010/0073276 | A1 * | 3/2010 | Koike et al. | 345/102 |
| 2010/0238356 | A1 * | 9/2010 | Kida et al. | 348/618 |

FOREIGN PATENT DOCUMENTS

| JP | 03-126377 A | 5/1991 |
| JP | 2005-159755 A | 6/2005 |
| JP | 2007-151125 A | 6/2007 |
| JP | 2011-250229 A | 12/2011 |

* cited by examiner

*Primary Examiner* — David Czekaj
*Assistant Examiner* — Dramos I Kalapodas
(74) *Attorney, Agent, or Firm* — Canon U.S.A., Inc. IP Division (57) ABSTRACT

A frequency of each gradation in an image for the left eye histogram is compared with a frequency of each gradation in an image for the right eye histogram. An integration histogram is generated using at least a larger one of the frequency of each gradation in the image for the left eye histogram and the frequency of each gradation in the image for the right eye histogram. A gradation correction parameter is set based on the generated integration histogram. The gradations of the image for the left eye and the image for the right eye are corrected using the gradation correction parameter.

10 Claims, 8 Drawing Sheets

| CLASS | 0 | 1 | 2 | 3 | 4 | 5 | 6 | 7 |
|---|---|---|---|---|---|---|---|---|
| FREQUENCY | 0 | 10000 | 518000 | 322000 | 238000 | 415000 | 268000 | 302600 |

| CLASS | 0 | 1 | 2 | 3 | 4 | 5 | 6 | 7 |
|---|---|---|---|---|---|---|---|---|
| FREQUENCY | 0 | 0 | 280000 | 276000 | 290000 | 450000 | 520000 | 257600 |

| CLASS | 0 | 1 | 2 | 3 | 4 | 5 | 6 | 7 |
|---|---|---|---|---|---|---|---|---|
| FREQUENCY | 0 | 10000 | 518000 | 299000 | 264000 | 432500 | 520000 | 280100 |

IMAGE PROCESSING APPARATUS FOR DISPLAYING IMAGE ON DISPLAY UNIT AND CONTROL METHOD THEREOF

BACKGROUND OF THE INVENTION

1. Field of the Invention

The present invention relates to an image processing apparatus capable of displaying an image for the left eye and an image for the right eye stereoscopically on a display unit, and a control method thereof.

2. Description of the Related Art

Japanese Patent Application Laid-Open No. 03-126377 discusses a technique for preferably correcting a gradation of a display image by setting a gradation correction parameter ($\gamma$ curve) for each frame based on an amount of characteristics such as an average luminance level (APL) of a frame or a luminance histogram. The gradation correction processing is expressed as dynamic $\gamma$ processing below.

Currently, a stereoscopic system has been known to stereoscopically display a three-dimensional (3D) video image including a left-eye video image and a right-eye video image using binocular parallax on a two-dimensional display screen. However, as a result of dynamic $\gamma$ processing for each frame of a pair of an image for the left eye and an image for the right eye capable of stereoscopic display, if a large difference is generated between a gradation of the image for the left eye and a gradation of the image for the right eye, the stereoscopic display becomes difficult or a feeling of fatigue for the eyes increases.

Therefore, as a correction method for suppressing the increase in difference between the image for the left eye and the image for the right eye, Japanese Patent Application Laid-Open No. 2005-159755 discusses a technique for setting a $\gamma$ curve based on an image of a common region between the image for the left eye and the image for the right eye and applying the $\gamma$ curve to the image for the left eye and the image for the right eye. Further, Japanese Patent Application Laid-Open No. 2007-151125 discusses a technique for correcting the image for the left eye and the image for the right eye based on an average value of characteristics such as the luminances of the image for the left eye and the image for the right eye.

Since an image for the left eye and an image for the right eye in the 3D image are originally images in different viewpoints, even in the case of an image in the common region between the image for the left eye and the image for the right eye, the image for the left eye is slightly different from the image for the right eye. However, Japanese Patent Application Laid-Open No. 2005-159755 does not specifically describe from which one of the image for the left eye and the image for the right eye in the common region the $\gamma$ curve is set, and how the $\gamma$ curve is set by using the image in the common region between the image for the left eye and the image for the right eye.

Further, Japanese Patent Application Laid-Open No. 2007-151125 does not specifically describe what is the average value of characteristics such as the luminances of the image for the left eye and the image for the right eye. The average value of the luminances of the image for the left eye and the image for the right eye is calculated using the luminances of the image for the left eye and the image for the right eye, and the image for the left eye and the image for the right eye are corrected using the $\gamma$ curve generated based on the gradation of the average value. In this case, a region with the luminance near the average value is properly corrected in the image for the left eye and the image for the right eye. However, a region with the luminance other than the average value cannot be properly corrected. When a specific region with a luminance value larger than the average value is included only in the image for the right eye, a large number of gradations are assigned to the gradation of the average value in the $\gamma$ curve and a large number of gradations are not assigned to the gradation value of the luminance in the specific region, so that the correction cannot be properly performed.

SUMMARY OF THE INVENTION

The present invention is directed to an image processing apparatus capable of, when correction of an image for the left eye and an image for the right eye that can be used for stereoscopic vision are performed, setting a $\gamma$ curve reflecting characteristics of the image for the left eye and the image for the right eye and properly correcting the image for the left eye and the image for the right eye, and a control method thereof.

According to an aspect of the present invention, an image processing apparatus capable of displaying an image for the left eye and an image for the right eye which can be used for stereoscopic vision on a display unit includes a first generation unit configured to generate a histogram of the image for the left eye and a histogram of the image for the right eye, a second generation unit configured to compare a frequency of each gradation in the histogram of the image for the left eye with a frequency of each gradation in the histogram of the image for the right eye which are generated by the first generation unit, and generate an integration histogram using at least a larger one of the frequency of each gradation in the histogram of the image for the left eye and the frequency of each gradation of the histogram of the image for the right eye, a setting unit configured to set a gradation correction parameter based on the integration histogram, and a correction unit configured to correct the gradations of the image for the left eye and the image for the right eye using the gradation correction parameter set by the setting unit.

According to the present invention, it is possible to provide an image processing apparatus and a control method thereof, in which when an image for the left eye and an image for the right eye that can be used for stereoscopic vision are corrected, a $\gamma$ curve is set reflecting characteristics of the image for the left eye and the image for the right eye, and the image for the left eye and the image for the right eye are properly corrected.

Further features and aspects of the present invention will become apparent from the following detailed description of exemplary embodiments with reference to the attached drawings.

BRIEF DESCRIPTION OF THE DRAWINGS

The accompanying drawings, which are incorporated in and constitute a part of the specification, illustrate exemplary embodiments, features, and aspects of the invention and, together with the description, serve to explain the principles of the invention.

DESCRIPTION OF THE EMBODIMENTS

Various exemplary embodiments, features, and aspects of the invention will be described in detail below with reference to the drawings.

Figure 1:
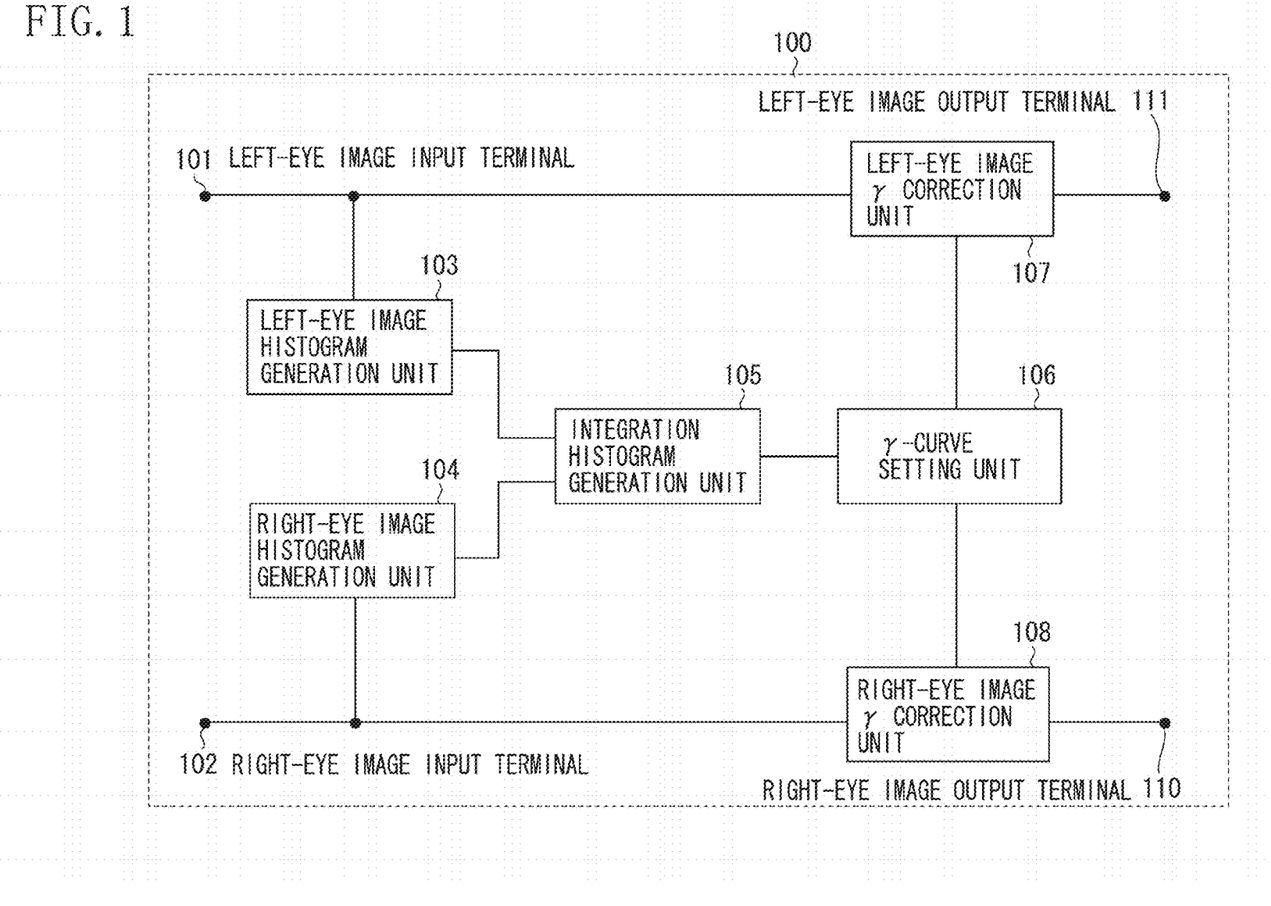
FIG. 1 illustrates a block diagram of a functional configuration of an image processing apparatus.

An image processing apparatus and a control method thereof according to the exemplary embodiments of the present invention are specifically described below. FIG. 1 illustrates a block diagram of a functional configuration of an image processing apparatus according to a first exemplary embodiment.

Referring to FIG. 1, an image processing apparatus 100 according to the present exemplary embodiment includes an image for the left eye input terminal 101, an image for the right eye input terminal 102, an image for the left eye histogram generation unit 103, an image for the right eye histogram generation unit 104, an integration histogram generation unit 105, and a γ curve setting unit 106. Further, the image processing apparatus 100 includes an image for the left eye γ correction unit 107, an image for the right eye γ correction unit 108, an image for the left eye output terminal 109, and an image for the right eye output terminal 110.

The image for the left eye input terminal 101 and the image for the right eye input terminal 102 respectively receive inputs of image signals of an image for the left eye and an image for the right eye which can be used for stereoscopic view. The image for the left eye histogram generation unit 103 generates a histogram of the input image for the left eye. The image for the right eye histogram generation unit 104 generates a histogram of the input image for the right eye. According to the present exemplary embodiment, a configuration for generating the luminance histogram is described.

The image for the left eye histogram generation unit 103 and the image for the right eye histogram generation unit 104 respectively generate histograms having a frequency as a number of pixels of each luminance value in one frame of the image for the left eye and the image for the right eye. The luminance value of each pixel in the image for the left eye and the image for the right eye can have 256 gradations ranging from 0 to 255 based on 8 bits.

According to the present exemplary embodiment, for the sake of a brief description, the image for the left eye histogram generation unit 103 or the image for the right eye histogram generation unit 104 generates the following histograms which can be classified into eight classes (gradations). More specifically, the eight classes (gradations) includes a class 0 of the luminance value ranging 0 to 31, a class 1 of the luminance value ranging 32 to 63, a class 2 of the luminance value ranging 64 to 95, a class 3 of the luminance value ranging 96 to 127, a class 4 of the luminance value ranging 128 to 159, a class 5 of the luminance value ranging 160 to 191, a class 6 of the luminance value ranging 192 to 223, and a class 7 of the luminance value ranging 224 to 255.

That is, the frequency of a pixel with the luminance value ranging from 0 to 31 is counted as the class 0, and the frequency of a pixel with the luminance value ranging from 32 to 63 is counted as the class 1. According to the present exemplary embodiment, the luminance histogram is generated with accuracy of the eight gradations. In addition, the luminance histogram may be generated with accuracy of 128 gradations or 256 gradations.

The integration histogram generation unit 105 generates an integration histogram used to correct the image for the left eye and the image for the right eye from the image for the left eye histogram and the image for the right eye histogram respectively generated by the image for the left eye histogram generation unit 103 and the image for the right eye histogram generation unit 104. A generation method of the integration histogram is described below.

The γ curve setting unit 106 sets a γ curve as a gradation correction parameter used for correcting the gradations of the image for the left eye and the image for the right eye from the integration histogram generated by the integration histogram generation unit 105. In the dynamic γ processing for gradation correction of the image for each frame, the γ curve is set to assign a large number of gradations to the class with a high frequency in the histogram, and the image is corrected. Therefore, an inclination of the γ curve increases to the class with a high frequency in the histogram.

The image for the left eye γ correction unit 107 and the image for the right eye γ correction unit 108 respectively perform γ correction processing of the image for the left eye and the image for the right eye using the γ curve set by the γ curve setting unit 106. Then, the γ corrected image for the left eye and the γ corrected image for the right eye are output to a display unit (not illustrated) from the image for the left eye output terminal 109 and the image for the right eye output terminal 110 respectively.

Figure 2:
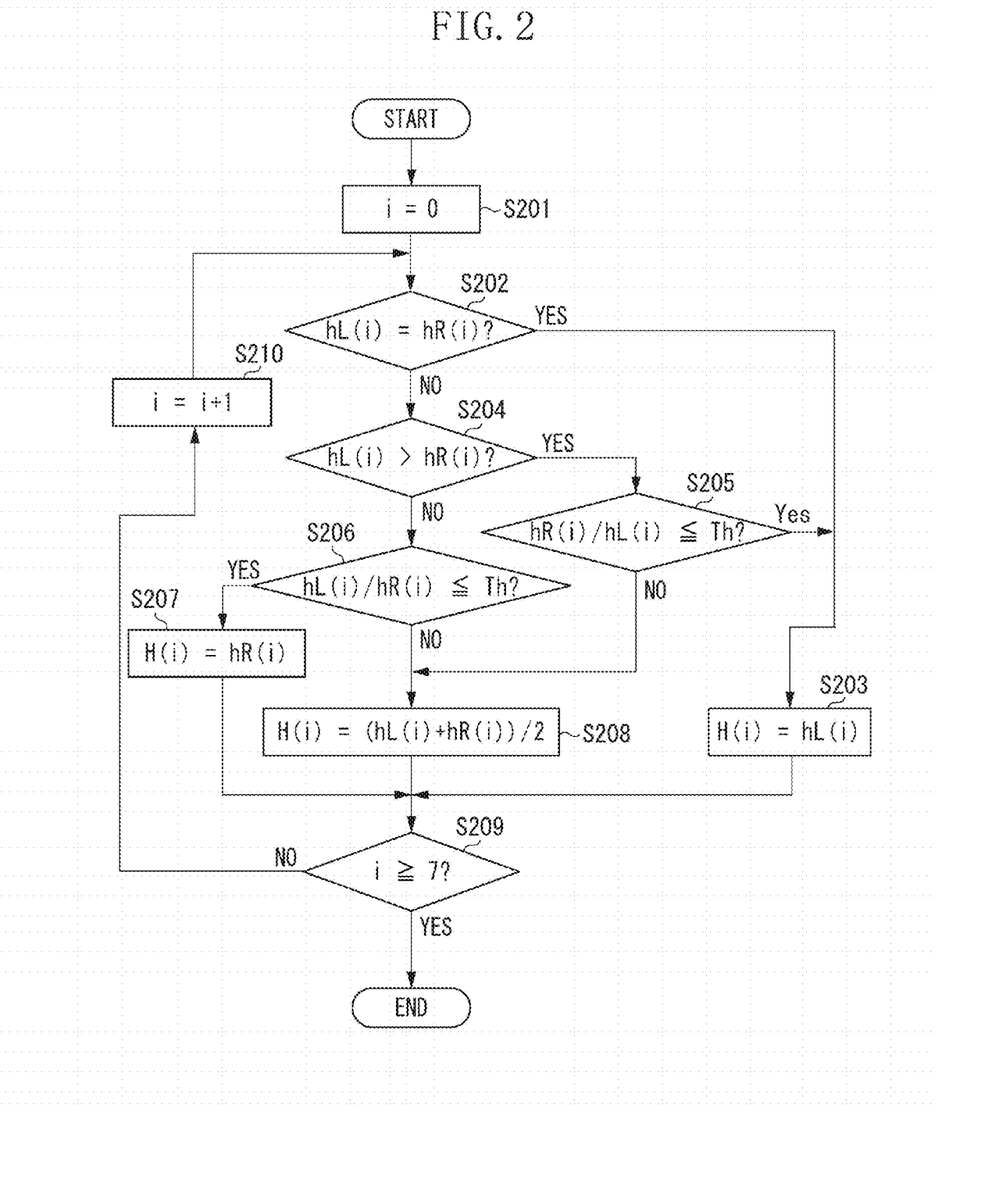
FIG. 2 illustrates a flowchart for generating an integration histogram.

The method for generating the integration histogram in the integration histogram generation unit 105 according to the present exemplary embodiment is described below. FIG. 2 illustrates a flowchart for generating the integration histogram. In FIG. 2, a subscript "i" indicating a class, a frequency hL(i) at the class i in the image for the left eye histogram, a frequency hR(i) at the class i in the image for the right eye histogram, and a frequency H(i) at the class i in the integration histogram are used.

In step S201, the class i is initialized to 0. Then the processing proceeds to step S202. In step S202, it is determined whether the frequency hL(i) is equal to the frequency hR(i). When the frequency hL(i) is equal to the frequency hR(i) (YES in step S202), the processing proceeds to step S203. When the frequency hL(i) is not equal to the frequency hR(i) (NO in step S202), the processing proceeds to step S204. In step S203, the frequency H(i) of the integration histogram is determined as a value of the frequency hL(i).

In step S204, it is determined whether the frequency hL(i) is larger than the frequency hR(i). When the frequency hL(i) is larger than the frequency hR(i) (YES in step S204), the processing proceeds to step S205. When the frequency hL(i) is not larger than the frequency hR(i) (NO in step S204), the processing proceeds to step S206.

In step S205, it is determined whether a value of hR(i)/hL(i) is equal to a threshold Th or less. Since the frequency hL(i) is larger than the frequency hR(i) in step S205, the threshold Th can be set to an arbitrary value smaller than 1. For example, it is assumed that the threshold Th is set to 0.7. In this case, in step S205, it is determined whether the frequency hR(i) is 0.7 times or less of the frequency hL(i). When the value of hR(i)/hL(i) is equal to the threshold Th or less (YES in step S205), the processing proceeds to step S203. When the value of hR(i)/hL(i) is larger than the threshold Th (NO in step S205), the processing proceeds to step S208, which will be described below.

In step S205, if it is determined that the value of hR(i)/hL(i) is equal to the threshold Th or less (YES in step S205), then in step S203, the frequency H(i) of the integration histogram is determined as a value of the frequency hL(i).

In step S204, if the frequency hL(i) is smaller than the frequency hR(i) (NO in step S204), then in step S206, it is determined whether a value of hL(i)/hR(i) is equal to the threshold Th or less. In step S206, similarly to step S205, the threshold Th can be set to an arbitrary value smaller than 1. When the threshold Th is set to 0.7, it is determined whether the frequency hL(i) is 0.7 times or less of the frequency hR(i). When the value of hL(i)/hR(i) is equal to the threshold Th or less (YES in step S206), the processing proceeds to step S207. When the value of hL(i)/hR(i) is larger than the threshold Th (NO in step S206), the processing proceeds to step S208.

In step S207, the frequency H(i) of the integration histogram is determined as a value of the frequency hR(i). In step S208, the frequency H(i) of the integration histogram is determined as a value of (hL(i)+hR(i))/2.

When the frequency H(i) of the integration histogram is determined in any of steps S203, S207, and S208, the processing proceeds to step S209. According to the present exemplary embodiment, the histogram is generated with accuracy of the total eight gradations having the classes 0 to 7. Thus, in step S209, it is determined whether the class i is 7 or more. When the class i is less than 7 (NO in step S209), the integration histogram includes the class to which the frequency is not yet determined. Thus, the processing proceeds to step S210 and the class i is incremented by one. Then, the processing proceeds to step S202. When the class i is 7 or more (YES in step S209), the processing ends.

When it is determined that the frequency hL(i) is equal to the frequency hR(i) (YES in step S202), the processing proceeds to step S203. Alternatively, the processing may proceed to step S207 or step S208. The frequency H(i) of the integration histogram to be determined is the same in any of the cases.

Figure 3A:
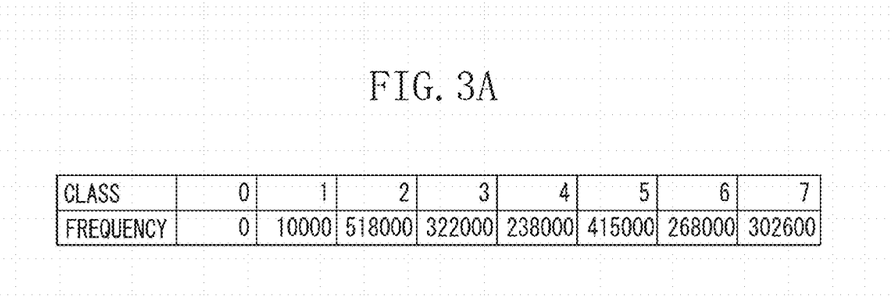
FIG. 3A illustrates a table of a frequency at each class in an image for the left eye histogram.
Figure 3B:
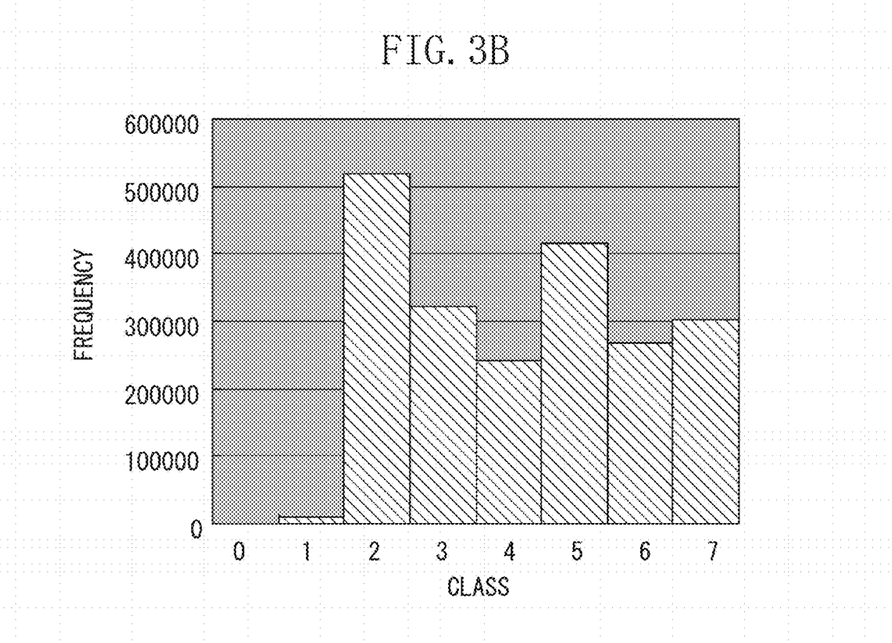
FIG. 3B illustrates a conceptual diagram of the image for the left eye histogram.
Figure 4A:
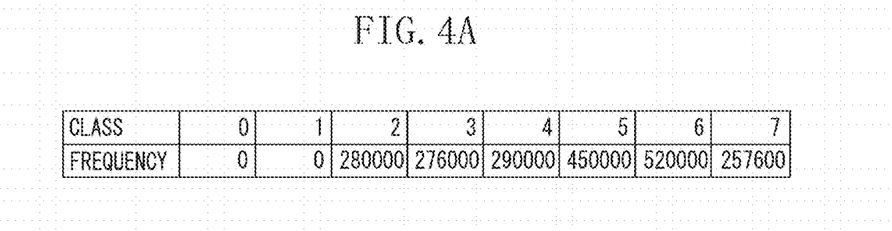
FIG. 4A illustrates a table of a frequency at each class in an image for the right eye histogram.
Figure 4B:
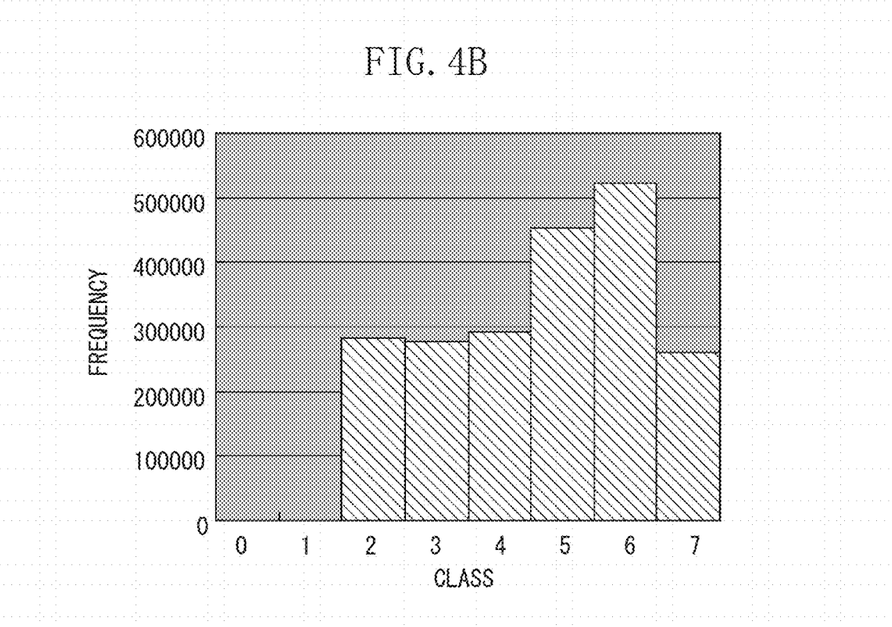
FIG. 4B illustrates a conceptual diagram of the image for the right eye histogram.

As a specific example, the description is given in which the image for the left eye histogram and the image for the right eye histogram respectively generated by the image for the left eye histogram generation unit 103 and the image for the right eye histogram generation unit 104 are as illustrated in FIGS. 3A, 3B, 4A, and 4B. When the frequency of the each class in the image for the left eye histogram is as illustrated in FIG. 3A, the image for the left eye histogram is as illustrated in FIG. 3B. When the frequency of the each class in the image for the right eye histogram is as illustrated in FIG. 4A, the image for the right eye histogram is as illustrated in FIG. 4B.

Figure 5A:
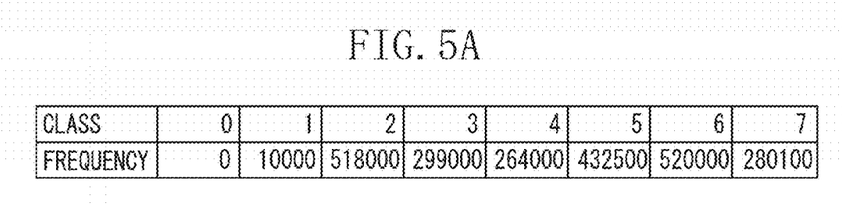
FIG. 5A illustrates a table of a frequency at each class in an integration histogram according to a first exemplary embodiment.
Figure 5B:
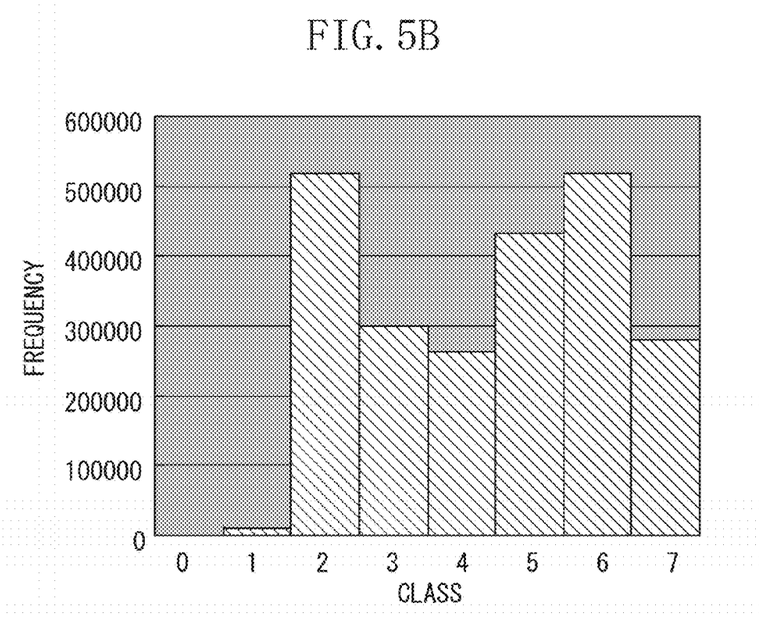
FIG. 5B illustrates a conceptual diagram of the integration histogram according to the first exemplary embodiment.

FIG. 5B illustrates the integration histogram generated by the integration histogram generation unit 105 by setting the threshold Th as 0.7 from the image for the left eye histogram and the image for the right eye histogram in FIGS. 3A, 3B, 4A, and 4B according to the processing in the flowchart in FIG. 2. When the frequency of each class in the integration histogram is as illustrated in FIG. 5A, the integration histogram is as illustrated in FIG. 5B.

The frequency of the class 6 in the integration histogram in FIG. 5B is equal to the frequency of the class 6 in the image for the right eye histogram. The frequencies of the classes 0, 1, and 2 in the integration histogram are respectively equal to the frequencies of the classes 0, 1, and 2 in the image for the left eye histogram. The frequencies of the classes 3, 4, 5, and 7 in the integration histogram are respectively equal to average values of the frequencies at the classes 3, 4, 5, and 7 in the image for the right eye histogram and the image for the left eye histogram.

Figure 6:
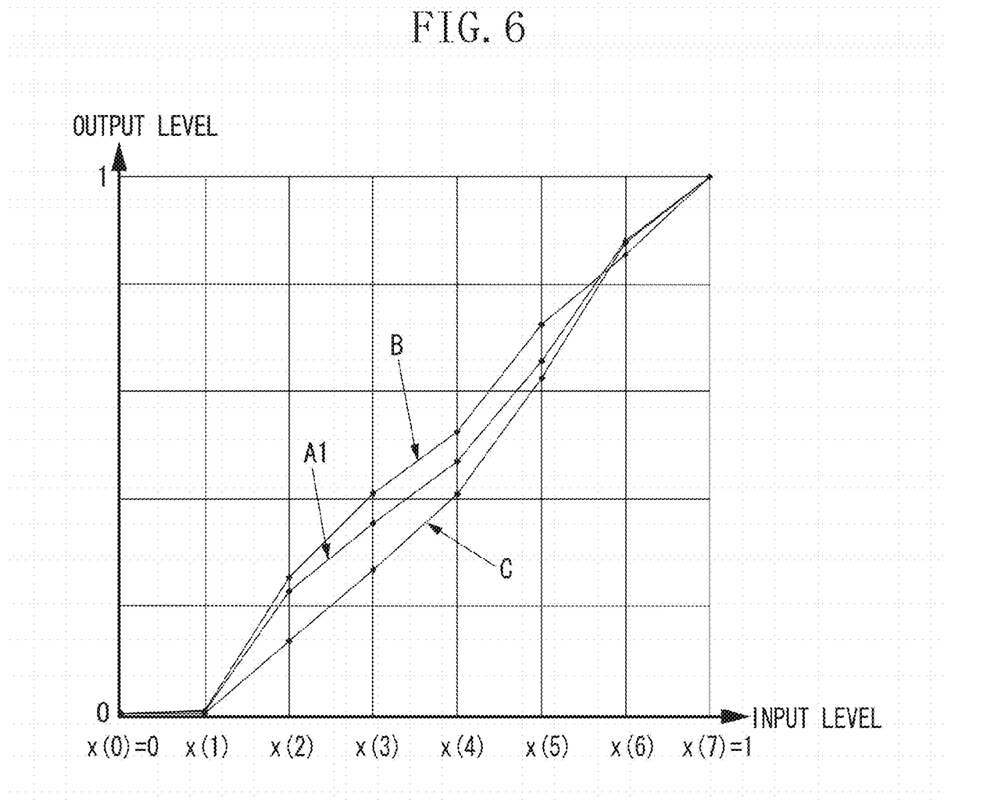
FIG. 6 illustrates a γ curve obtained from the histogram in FIGS. 5A and 5B.

The γ curve setting unit 106 sets the γ curve based on the integration histogram in FIG. 5B generated by the integration histogram generation unit 105. FIG. 6 illustrates a γ curve A1 set by the γ curve setting unit 106, a γ curve B obtained from the image for the left eye histogram in FIG. 3B, and a γ curve C obtained from the image for the right eye histogram in FIG. 4B.

A graph of the γ curve in FIG. 6 is set so that the output level will be 0 to 1 when the input level changes 0=x(0) to 1=x(7). According to the present exemplary embodiment, the histogram is generated with accuracy of the 8 gradations. Thus, a conventionally known technique can be used to set the γ curve from the histogram.

According to the present exemplary embodiment, the integration histogram generated by the integration histogram generation unit 105 is accumulated and added, and the resultant histogram is divided by the sum of frequencies of the integration histogram and normalized, so that the γ curve is set. In order to assign a large number of gradations to the class with a high frequency, it is desirable that the γ curve is set to increase an inclination of the γ curve. The frequency of the class i in the integration histogram in FIG. 5B is reflected to the inclination of the γ curve at the input level from x(i−1) to x(i) in FIG. 6. For example, in the γ curve with the high frequency at the class 2, the inclination increases at the input level from x(1) to x(2).

As illustrated in FIG. 6, in the γ curve B obtained from the image for the left eye histogram, a large number of gradations cannot be assigned to the class 6 which has the high frequency in the image for the right eye histogram, and the inclination thereof is reduced at the input level from x(5) to x(6). Therefore, if the image for the right eye is corrected using the γ curve B obtained from the image for the left eye histogram, the correction is executed while colors near the class 6 are not appropriately expressed.

In the γ curve C obtained from the image for the right eye histogram, a large number of gradations cannot be assigned to the class 2 which has the high frequency in the image for the left eye histogram, and the inclination thereof is reduced at the input level from x(1) to x(2). Therefore, if the image for the left eye is corrected using the γ curve C obtained from the image for the right eye histogram, the correction is executed while colors near the class 2 are not appropriately expressed.

On the other hand, in the γ curve A1 obtained from the integration histogram, at the class 2 with the high frequency in the image for the left eye histogram and the class 6 with the high frequency in the image for the right eye histogram, both of the inclination at the input level from x(1) to x(2) and the inclination at the input level from x(5) to x(6) are set to be high. Therefore, a large number of gradations can be assigned and, when the image for the left eye and the image for the right eye are corrected using the γ curve A1, both the images are corrected without causing inappropriate color expression.

According to the present exemplary embodiment, the configuration for generating the luminance histogram is described. However, the present invention is not limited to this configuration, and can be applied to a configuration in which the image can be corrected using the γ curve set based on the histogram. According to the present exemplary embodiment, the histogram of the luminance value of each pixel is used. Alternatively, the integration histogram may be generated by generating histograms of the highest gradation value in red, green and blue (RGB) of each pixel for the image for the left eye and the image for the right eye.

When a gradation value of green (G is higher than gradation values of red (R) and blue (B) in the RGB of a certain pixel, the gradation value of the pixel is counted as the gradation value of G, and the histogram is thus generated. For RGB color gradations of the pixel, an R histogram, a G histogram, and a B histogram are generated. Integration histograms can be generated for each of R, G, and B based on the image for the left eye histogram and the image for the right eye histogram. An R γ curve, a G γ curve, and a Bγ curve may be set from the generated integration histogram of the color R, the generated integration histogram of the color G, and the generated integration histogram of the color B, and used for image correction.

As described above, by using the γ curve set from the integration histogram generated according to the present exemplary embodiment for correction of the image for the left eye and the image for the right eye, the image for the left eye and the image for the right eye can be properly corrected.

According to the first exemplary embodiment, the threshold Th is provided when the integration histogram is generated. Further, the frequency used for the integration histogram is determined according to as whether there is the difference of the threshold Th or more in the frequency of each class between the image for the left eye histogram and the image for the right eye histogram. According to a second exemplary embodiment, a description is given of the case in which the frequency of each class in the image for the left eye histogram is compared with the frequency of each class in the image for the right eye histogram, and a value of a higher frequency is used as the frequency of each gradation in the integration histogram.

A functional configuration of an image processing apparatus according to the present exemplary embodiment is similar to that illustrated in FIG. 1, thus, the description thereof is omitted. According to the present exemplary embodiment, the integration histogram generation unit 105 performs processing different from the first exemplary embodiment. The integration histogram generation unit 105 generates the integration histogram from the image for the left eye histogram and the image for the right eye histogram respectively generated by the image for the left eye histogram generation unit 103 and the image for the right eye histogram generation unit 104.

According to the generation method of the integration histogram with the integration histogram generation unit 105, similarly to the first exemplary embodiment, the frequency of each class is compared between the frequency of each class of the image for the left eye histogram and the frequency of each class of the image for the right eye histogram. According to the present exemplary embodiment, as a comparison result, a larger one of the frequency of the image for the left eye and the frequency of the image for the right eye at each class is set as a frequency of each class in the integration histogram.

Figure 7A:
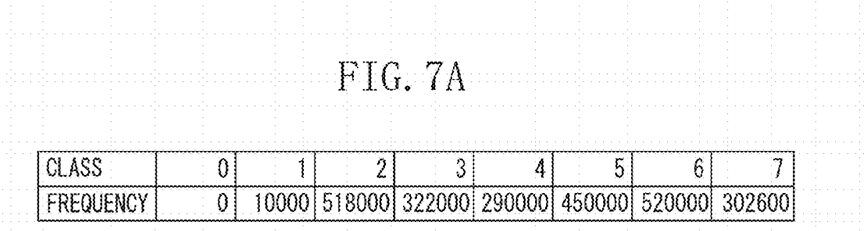
FIG. 7A illustrates a table of a frequency at each class in an integration histogram according to a second exemplary embodiment.
Figure 7B:
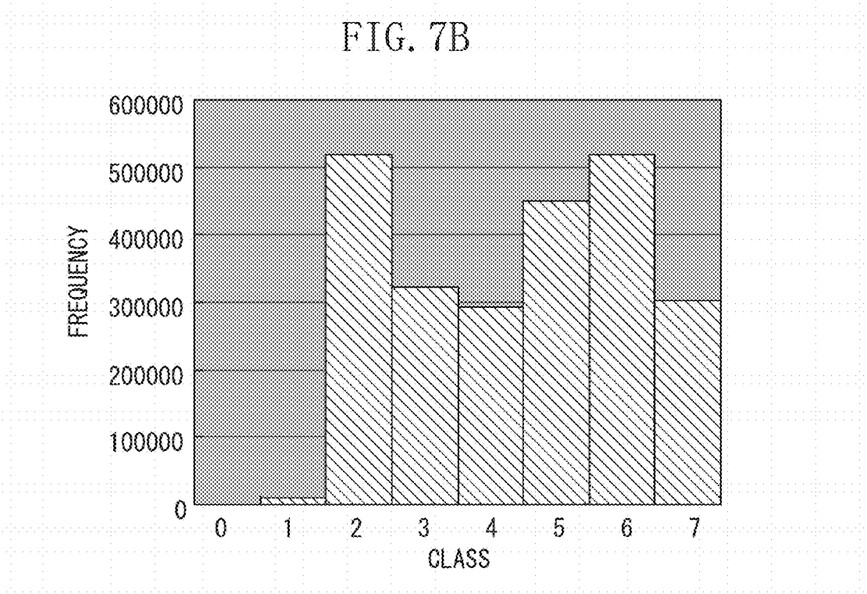
FIG. 7B illustrates a conceptual diagram of the integration histogram according to the second exemplary embodiment.
Figure 8:
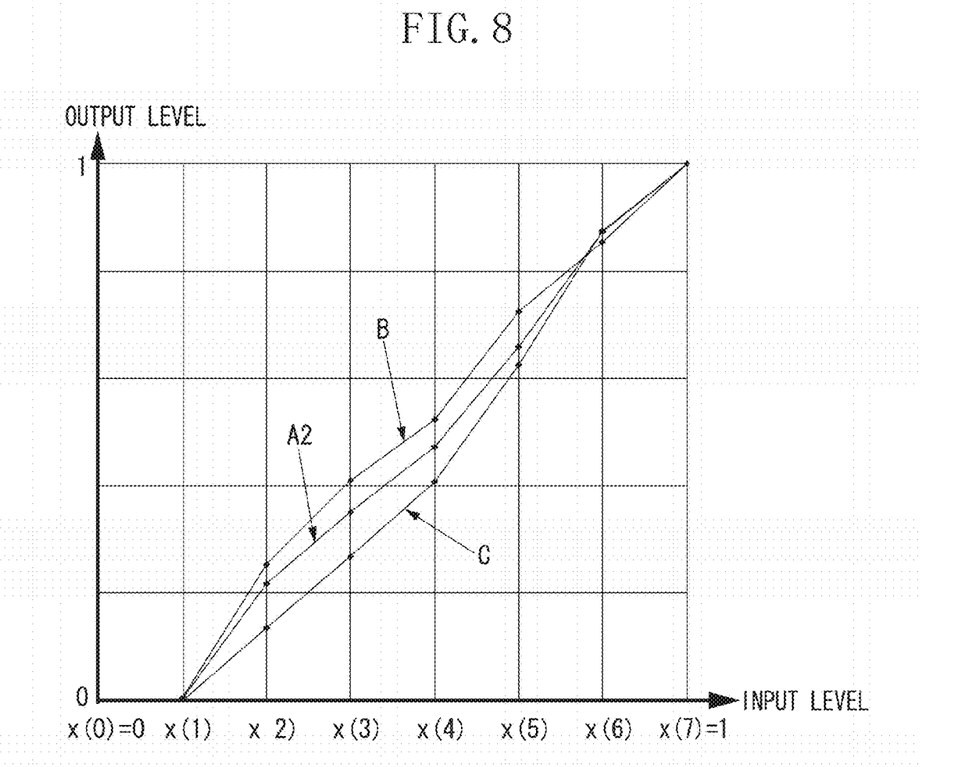
FIG. 8 illustrates a γ curve obtained from the histogram in FIGS. 7A and 7B.

FIGS. 7A and 7B illustrate the integration histogram according to the present exemplary embodiment. FIG. 8 illustrates the γ curve set from the integration histogram. When the frequency of each class in the integration histogram is as illustrated in FIG. 7A, the integration histogram is as illustrated in FIG. 7B.

FIG. 8 illustrates a γ curve A2 obtained from the integration histogram in FIG. 7B, a γ curve B obtained from the image for the left eye histogram in FIG. 3B, and a γ curve C obtained from the image for the right eye histogram in FIG. 4B. The γ curve B and the γ curve C in FIG. 8 are similar to the γ curve B and the γ curve C in FIG. 6. As a method for setting the γ curve from the histogram, a conventionally known technique is used similarly to the first exemplary embodiment.

In the γ curve A2 obtained from the integration histogram in FIG. 8, at the class 2 with the high frequency in the image for the left eye histogram and the class 6 with the high frequency in the image for the right eye histogram, both of the inclination at the input level from x(1) to x(2) and the inclination at the input level from x(5) to x(6) are set to be high. Therefore, a large number of gradations can be assigned and, when the image for the left eye and the image for the right eye are corrected using the γ curve A2, both the images are corrected without causing inappropriate color expression.

As described above, according to the present exemplary embodiment, it is possible to set the γ curve in which a large number of gradations is assigned to the class with the high frequency in the image for the left eye histogram and the image for the right eye histogram. Therefore, the image for the left eye and the image for the right eye that can be used for the stereoscopic vision can be properly corrected.

While the present invention has been described with reference to exemplary embodiments, it is to be understood that the invention is not limited to the disclosed exemplary embodiments. The scope of the following claims is to be accorded the broadest interpretation so as to encompass all modifications, equivalent structures, and functions.

This application claims priority from Japanese Patent Application No. 2010-148210 filed Jun. 29, 2010, which is hereby incorporated by reference herein in its entirety.

What is claimed is:

1. An image processing apparatus comprising:
an obtaining unit configured to obtain a histogram of the image for the left eye and a histogram of the image for the right eye;
a determination unit configured to compare a frequency of each gradation range of the histogram of the image for the left eye with a frequency of each gradation range of the histogram of the image for the right eye and determine which frequency is larger in each gradation range;
a generation unit configured to generate a histogram using at least a larger one of the frequency of each gradation range in the histogram of the image for the left eye and the frequency of each gradation range of the histogram of the image for the right eye based on a result determined by the determination unit;
a setting unit configured to set a gradation correction parameter based on the generated histogram;
a correction unit configured to correct the gradations of both the image for the left eye and the image for the right eye using the gradation correction parameter set by the setting unit;
wherein the generation unit generates the generated histogram without using a smaller one of the frequency of each gradation range of the histogram of the image for the left eye and the frequency of each gradation range of the histogram of the image for the right eye based on the result determined by the determination unit; and
an output unit configured to output the image for the left eye and the image for the right eye each corrected by the correction unit.

2. The image processing apparatus according to claim 1, wherein, if a difference between the frequency of each gradation range in the histogram of the image for the left eye and the frequency of each gradation range in the histogram of the image for the right eye is equal to a predetermined value or more, the generation unit sets a larger one of the frequency of the gradation range in the histogram of the image for the left eye and the frequency of the gradation range in the histogram of the image for the right eye as the frequency of the gradation range in the generated histogram.

3. The image processing apparatus according to claim 2, wherein, if the difference between the frequency of each gradation range in the histogram of the image for the left eye and the frequency of each gradation range in the histogram of the image for the right eye is less than the predetermined value, the generation unit sets an average value of the frequency of the gradation range in the histogram of the image for the left eye and the frequency of the gradation range in the histogram of the image for the right eye as the frequency of the gradation range in the generated histogram.

4. The image processing apparatus according to claim 1, wherein the histogram generated by the generation unit is a histogram on a luminance value or a histogram on a color value.

5. A method for controlling an image processing apparatus, the method comprising:
   obtaining a histogram of the image for the left eye and a histogram of the image for the right eye;
   comparing a frequency of each gradation range of the histogram of the image for the left eye with a frequency of each gradation range of the histogram of the image for the right eye and determine which frequency is larger in each gradation range;
   generating a histogram using at least a larger one of the frequency of each gradation range in the histogram of the image for the left eye and the frequency of each gradation range of the histogram of the image for the right eye;
   setting a gradation correction parameter based on the generated histogram;
   correcting the gradations of both the image for the left eye and the image for the right eye using the set gradation correction parameter;
   wherein the generation unit generates the generated histogram without using a smaller one of the frequency of each gradation range of the histogram of the image for the left eye and the frequency of each gradation range of the histogram of the image for the right eye based on the result determined by the determination unit; and
   outputting the image for the left eye and the image for the right eye which have each been corrected.

6. The image processing apparatus according to claim 1, wherein the histogram obtained by the obtaining unit is a histogram on a luminance value or a histogram on a color value.

7. The image processing method according to claim 5, wherein, if a difference between the frequency of each gradation range in the histogram of the image for the left eye and the frequency of each gradation range in the histogram of the image for the right eye is equal to a predetermined value or more, setting a larger one of the frequency of the gradation range in the histogram of the image for the left eye and the frequency of the gradation range in the histogram of the image for the right eye as the frequency of the gradation range in the generated histogram.

8. The image processing method according to claim 7, wherein, if the difference between the frequency of each gradation range in the histogram of the image for the left eye and the frequency of each gradation range in the histogram of the image for the right eye is less than the predetermined value, setting an average value of the frequency of the gradation range in the histogram of the image for the left eye and the frequency of the gradation range in the histogram of the image for the left eye and the frequency of the gradation range in the histogram of the image for the right eye as the frequency of the gradation range in the generated histogram.

9. The image processing method according to claim 5, wherein the histogram generated is a histogram on a luminance value or a histogram on a color value.

10. The image processing method according to claim 5, wherein the histogram obtained is a histogram on a luminance value or a histogram on a color value.

* * * * *